(12) United States Patent
Beckett et al.

(10) Patent No.: US 11,799,731 B2
(45) Date of Patent: Oct. 24, 2023

(54) REPRESENTATION AND ORCHESTRATION FOR VIRTUAL WIDE AREA NETWORKS

(71) Applicant: Microsoft Technology Licensing, LLC, Redmond, WA (US)

(72) Inventors: Ryan Andrew Beckett, Redmond, WA (US); Sharad Agarwal, Seattle, WA (US); Paramvir Bahl, Bellevue, WA (US); Rachee Singh, Redmond, WA (US); Abhishek Udupa, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/358,737

(22) Filed: Jun. 25, 2021

(65) Prior Publication Data

US 2022/0417103 A1    Dec. 29, 2022

(51) Int. Cl.
*H04L 41/12* (2022.01)
*H04L 12/46* (2006.01)

(52) U.S. Cl.
CPC .......... *H04L 41/12* (2013.01); *H04L 12/4633* (2013.01)

(58) Field of Classification Search
CPC ............................ H04L 41/12; H04L 12/4633
See application file for complete search history.

(56) References Cited

U.S. PATENT DOCUMENTS 11,463,366 B1 * 10/2022 Burnett ............... H04L 41/0886
2001/0019554 A1    9/2001 Nomura et al.
2004/0117339 A1 *  6/2004 Thubert ................ H04L 45/36
2008/0002588 A1    1/2008 Mccaughan et al.
2009/0319502 A1   12/2009 Chalouhi et al.
(Continued)

FOREIGN PATENT DOCUMENTS

WO    2014147197 A1    9/2014
WO    2020112345 A1    6/2020

OTHER PUBLICATIONS

Mimidis, Angelos, "Policy Framework For ONOS", Retrieved from: https://wiki.onosproject.org/display/ONOS/POLICY+FRAMEWORK+FOR+ONOS#POLICYFRAMEWORKFORONOS-Introduction, Feb. 26, 2019, 9 Pages.

(Continued)

*Primary Examiner* — Tonia L Dollinger
*Assistant Examiner* — Joseph M Cousins
(74) *Attorney, Agent, or Firm* — ARENTFOX SCHIFF LLP

(57) ABSTRACT

Described are examples for providing management of a virtual wide area network (vWAN) based on operator policies. A network orchestrator presents, to a network operator, a representation of the vWAN including virtual network entities associated with respective geographic locations and virtual connections between the virtual network entities. The network orchestrator receives a policy for the virtual wide area network from the network operator via the representation, the policy to be implemented at one or more of the virtual connections. The network orchestrator translates the policy for the virtual wide area network into a configuration of an underlying wide area network (WAN). The underlying WAN a plurality of geographically distributed physical computing resources in geographic regions corresponding to the virtual network entities and connections there between.

19 Claims, 5 Drawing Sheets

(56) References Cited

U.S. PATENT DOCUMENTS

| | | | |
|---|---|---|---|
| 2011/0019676 A1 | 1/2011 | Portolani et al. | |
| 2014/0310605 A1 | 10/2014 | Basile et al. | |
| 2015/0195187 A1 | 7/2015 | Savolainen | |
| 2016/0197834 A1* | 7/2016 | Luft | H04L 12/46 |
| | | | 709/223 |
| 2016/0315808 A1 | 10/2016 | Saavedra | |
| 2017/0105113 A1 | 4/2017 | Seenappa et al. | |
| 2019/0268973 A1 | 8/2019 | Bull et al. | |
| 2019/0274070 A1* | 9/2019 | Hughes | H04L 45/64 |
| 2019/0280935 A1* | 9/2019 | Aftab | H04L 41/40 |
| 2019/0349259 A1 | 11/2019 | Rovner et al. | |
| 2020/0296029 A1* | 9/2020 | Shenoy | H04L 41/12 |
| 2021/0067464 A1 | 3/2021 | Cidon et al. | |
| 2021/0067468 A1* | 3/2021 | Cidon | H04L 41/0813 |
| 2021/0091973 A1 | 3/2021 | Gwun | |
| 2021/0092064 A1* | 3/2021 | Sidebottom | H04L 67/1042 |
| 2021/0168027 A1 | 6/2021 | Parulkar et al. | |
| 2021/0267014 A1 | 8/2021 | Kakinada et al. | |
| 2022/0103471 A1* | 3/2022 | Kulkarni | H04L 12/4641 |
| 2022/0191647 A1* | 6/2022 | Zohoorian | H04W 24/08 |

OTHER PUBLICATIONS

"International Search Report and Written Opinion Issued in PCT Application No. PCT/US22/029723", dated Jul. 22, 2022, 14 Pages.

"Non Final Office Action Issued in U.S. Appl. No. 17/377,088", dated Jun. 2, 2022, 12 Pages.

"International Search Report and Written Opinion Issued in PCT Application No. PCT/US22/030988", dated Aug. 29, 2022, 13 Pages.

"Notice of Allowance Issued in U.S. Appl. No. 17/377,088", dated Dec. 9, 2022, 11 Pages.

* cited by examiner

REPRESENTATION AND ORCHESTRATION FOR VIRTUAL WIDE AREA NETWORKS

BACKGROUND

Wide area networks may include computing resources spread across a geographic region and connected via communication links such as fiber optic cables. The size of wide area networks may vary greatly from a small city to a global network. For example, a WAN may connect multiple offices of an enterprise, the customers of a regional telecommunications operator, or a global enterprise. The computing resources and connections within a WAN may be owned and controlled by the WAN operator.

In some scenarios, a WAN operator may want to expand the reach of the WAN, for example, to connect to an area where the WAN operator does not have physical resources. A virtual WAN (vWAN) may be a service provided by a vWAN operator (e.g., the operator of a larger WAN), that allows smaller WAN operators to share the computing resources and connections of the larger WAN. The vWAN operator may make service level agreements (SLAs) with the WAN operator to provide various computing and network services. For example, the vWAN operator may agree to host an application at one or more geographic locations, provide connectivity to the application via the Internet, and provide connectivity between the geographic locations with guaranteed metrics. In existing vWANs, the WAN operator may have little control over the underlying network of the vWAN operator. In particular, the WAN operator may not control routing decisions within the vWAN.

One concern with using a vWAN is that the WAN operator may unknowingly violate a policy. For example, the policy may be a government regulation applicable to the WAN operator that governs export of data. For instance, the regulation may specify that certain types of data may only be exported to countries that comply with certain standards. Similar policies may be requested by users of the WAN. Accordingly, it may be desirable for a vWAN operator to expose some information about a network architecture underlying the vWAN and enable a WAN operator to specify policies within the vWAN, while the vWAN operator may maintain ultimate control over the underlying network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, an apparatus for o for managing policies for a virtual wide area network (vWAN) is provided. The apparatus includes a memory storing one or more instructions for managing the vWAN and at least one processor coupled to the memory and configured to execute the instructions. The at least one processor is configured to present, to a network operator, a representation of the vWAN including virtual network entities associated with respective geographic locations and virtual connections between the virtual network entities. The at least one processor is configured to receive a policy for the virtual wide area network from the network operator via the representation, the policy to be implemented at one or more of the virtual connections. The at least one processor is configured to translate the policy for the virtual wide area network into a configuration of an underlying wide area network (WAN).

In another example, a method of configuring a virtual wide area network (vWAN) is provided. The method includes presenting, to a network operator, a representation of the vWAN including virtual network entities associated with respective geographic locations and virtual connections between the virtual network entities. The method includes receiving a policy for the virtual wide area network from the network operator via the representation, the policy to be implemented at one or more of the virtual connections. The method includes translating the policy for the virtual wide area network into a configuration of an underlying wide area network (WAN).

In another example, a system for managing configuration and policies for a virtual wide area network (vWAN) includes a wide area network (WAN) including a plurality of geographically distributed physical computing resources and connections there between. The system includes a network orchestrator including a memory storing one or more parameters or instructions for managing the vWAN on the WAN and at least one processor coupled to the memory and configured to execute the instructions. The at least one processor is configured to present, to a network operator, a representation of the vWAN including virtual network entities associated with respective geographic locations and virtual connections between the virtual network entities. The at least one processor is configured to receive a policy for the virtual wide area network from the network operator via the representation, the policy to be implemented at one or more of the virtual connections. The at least one processor is configured to translate the policy for the virtual wide area network into a configuration of the WAN.

In some implementations, the underlying WAN includes a plurality of physical resources located within each respective geographic location represented by a virtual network entity.

In some implementations, the policy for the virtual WAN includes policies for a plurality of traffic classes.

In some implementations, to translate the configuration of the virtual WAN, the at least one processor is configured to establish tunnels that each appear as a single connection between two of the virtual network entities, each tunnel associated with requirements based on the policy; and to apply the configuration to the underlying WAN, the at least one processor is configured to configure a plurality of nodes along a path in the underlying WAN to satisfy the requirements of each tunnel. Configuring the plurality of nodes in the underlying WAN may include configuring a truncated protocol forwarding mechanism. Configuring the plurality of nodes in the underlying WAN may include configuring routing tables at each node along the path. Configuring the plurality of nodes in the underlying WAN to satisfy the requirements may be based on a cost metric.

In some implementations, the virtual network entities include an operator network and a boundary between the operator network and the virtual WAN.

In some implementations, the representation of the virtual WAN includes services of third parties hosted on the underlying WAN and the virtual connections include connections between virtual network entities and the services of the third parties.

In some implementations, the policy for the virtual WAN includes one or more of a routing policy, a performance policy, a peering policy, or a geographic policy.

In some implementations, the policy for the virtual WAN includes a hardware constraint.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to representation and orchestration of a virtual wide area network (vWAN). In an aspect, a WAN orchestrator provides an operator dashboard to a network operator. For example, the network operator may be a customer of the vWAN with an operator network that is connected to the vWAN. The operator dashboard allows the network operator to configure various policies within the vWAN. The operator dashboard provides a representation of the vWAN including virtual network entities associated with respective geographic locations and virtual connections between the virtual network entities. The representation may be an abstraction of an underlying WAN controlled by the vWAN operator. The representation of the vWAN may allow the vWAN operator to expose some aspects of the underlying WAN architecture that may be useful for the network operator to set policies. The representation of the vWAN, however, may hide details regarding physical resources. Accordingly, the vWAN operator may modify the underlying WAN without changing the representation of the vWAN.

The WAN orchestrator may receive policies from the network operator via the representation of the vWAN. The WAN orchestrator may translate the received policies into a configuration of the underlying WAN. For example, a routing policy may specify a route including a specific virtual connection to use or a specific virtual network entity as a destination for a class of traffic. A performance policy may specify a traffic tier or a specific performance metric to be targeted for a class of traffic. A peering policy may specify a peering between an operator network and a vWAN network entity. A geographic policy may specify geographic regions for a traffic class. In particular, a geographic policy may specify geographic regions (e.g., countries) that traffic is not allowed to traverse. A hardware constraint may specify restrictions on hardware. For example, a hardware constraint may specify that equipment from a vendor with known security vulnerabilities is not to be used.

Figure 2:
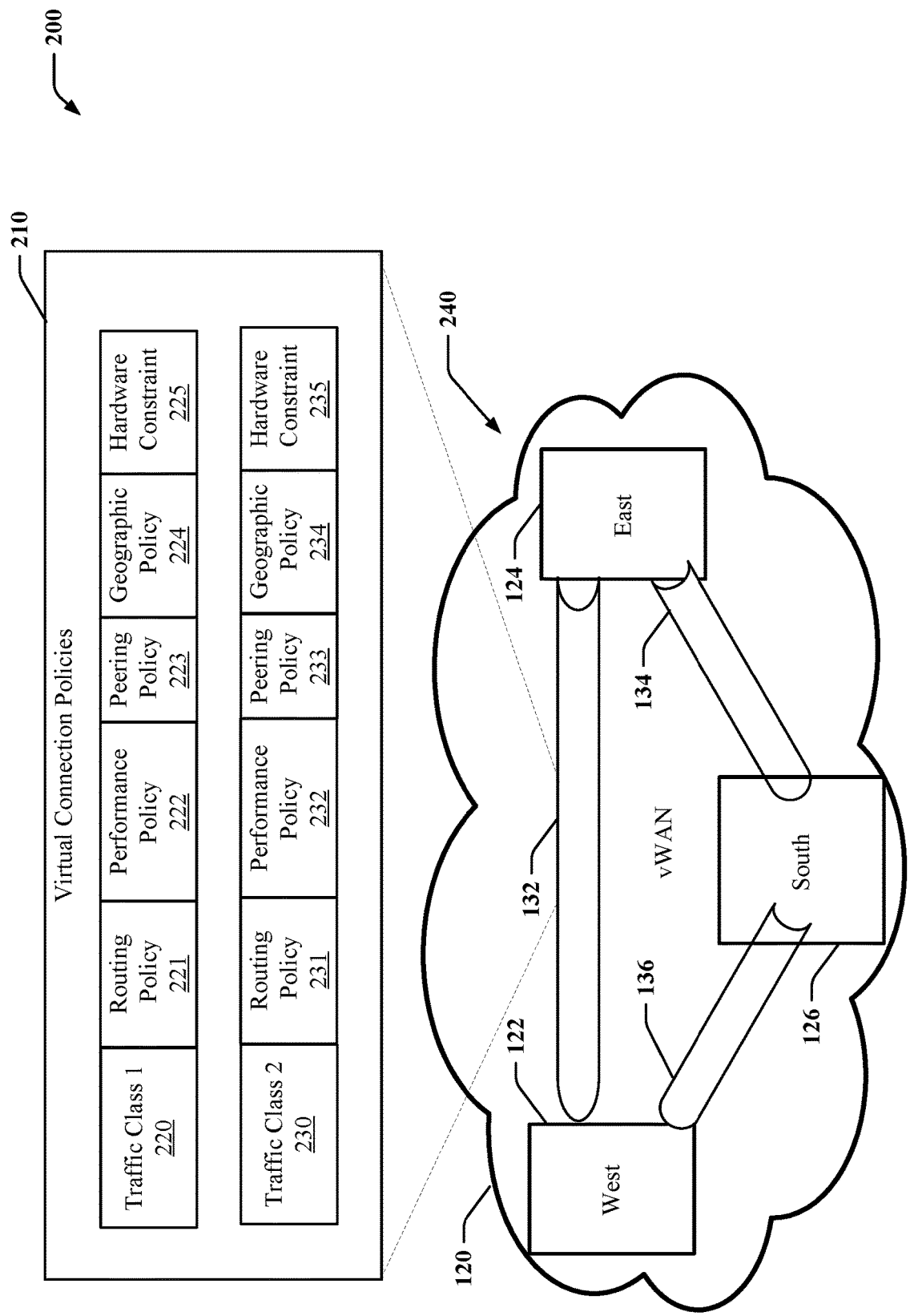
FIG. 2 is a diagram of an example of policies for a virtual connection, in accordance with aspects described herein.
Figure 3:
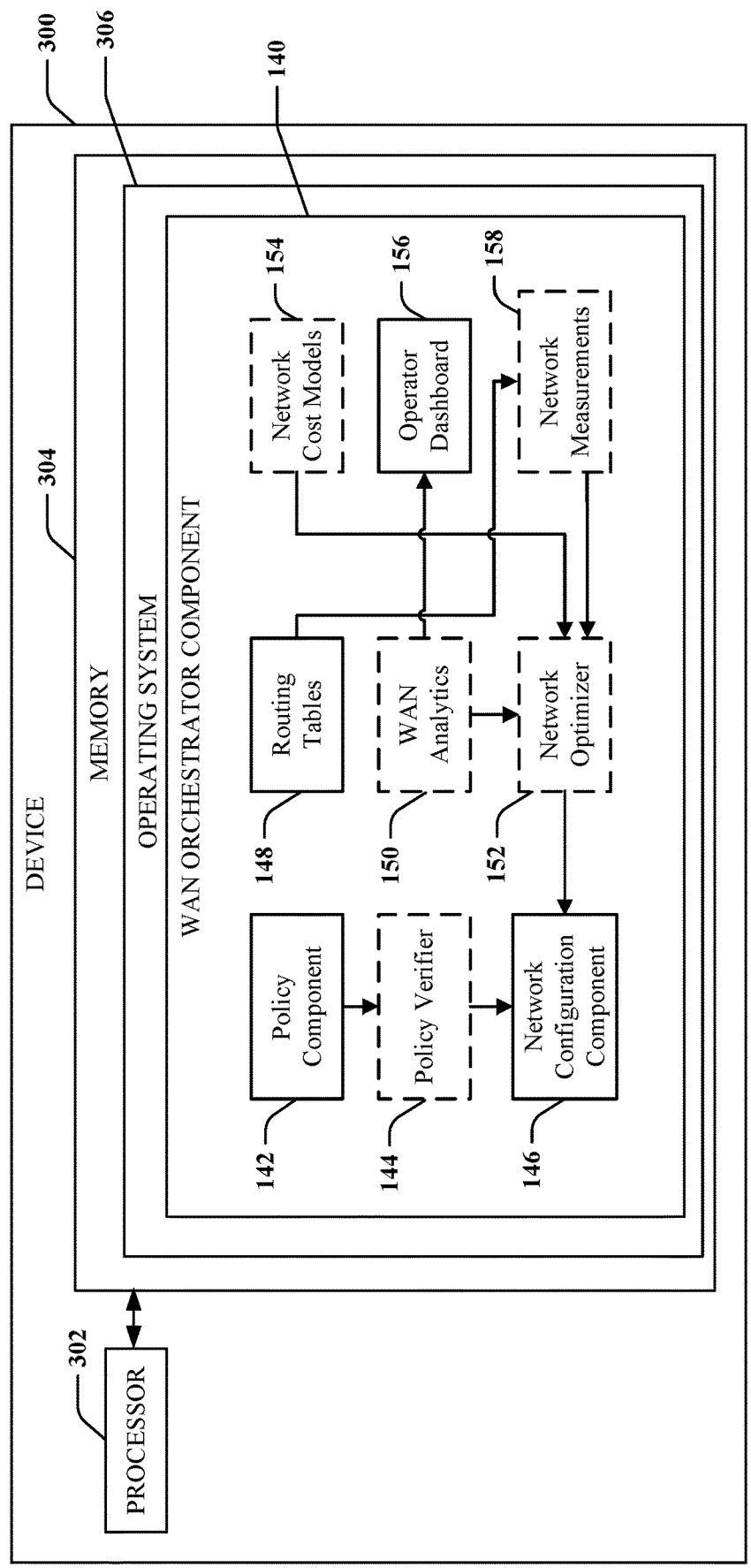
FIG. 3 is a schematic diagram of an example of a device for setting policies for virtual connections in a vWAN, in accordance with aspects described herein.
Figure 4:
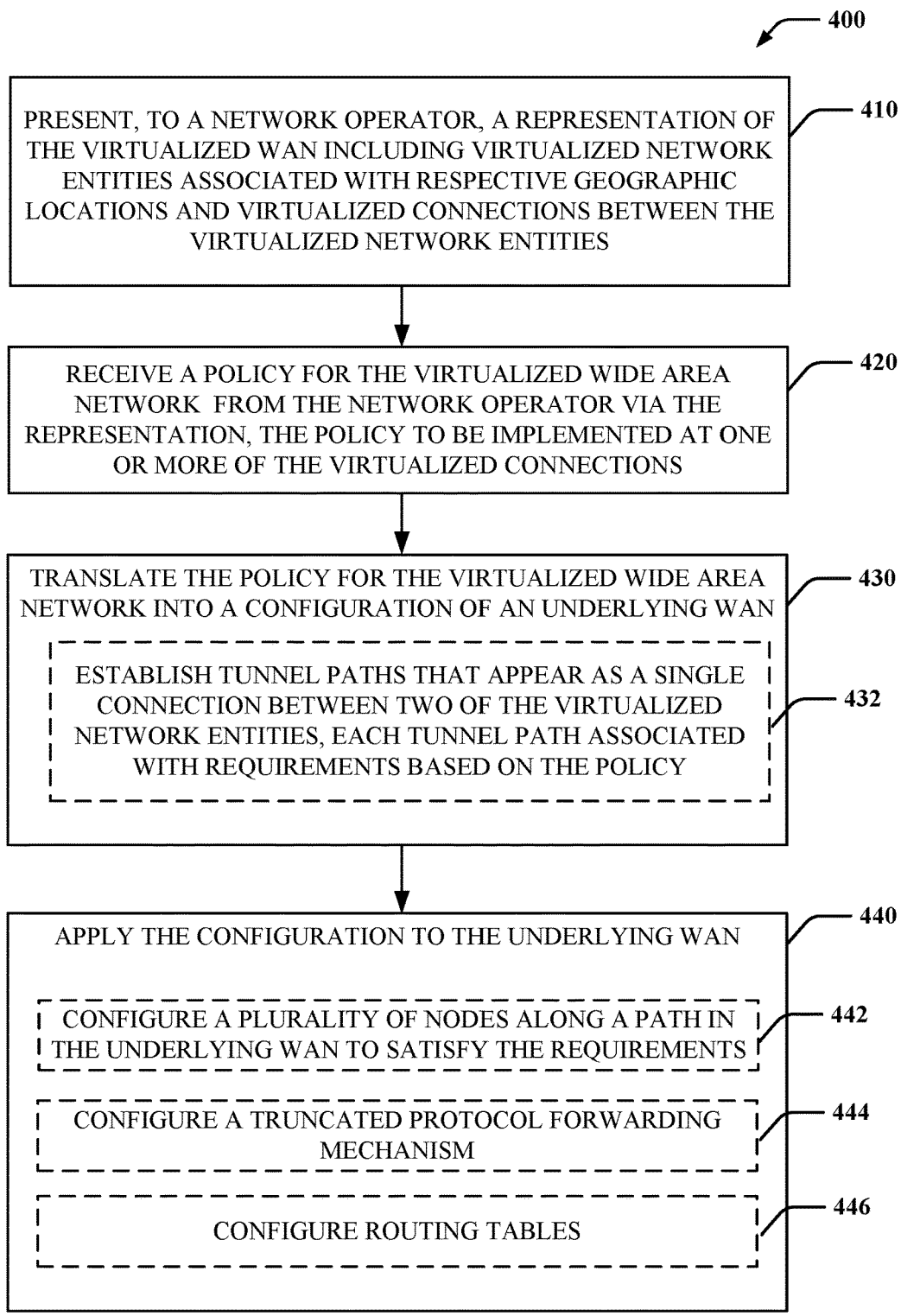
FIG. 4 is a flow diagram of an example of a method of setting policies for virtual connections in a vWAN, in accordance with aspects described herein.

Turning now to FIGS. 1-5, examples are depicted with reference to one or more components and one or more methods that may perform the actions or operations described herein, where components and/or actions/operations in dashed line may be optional. Although the operations described below in FIG. 4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
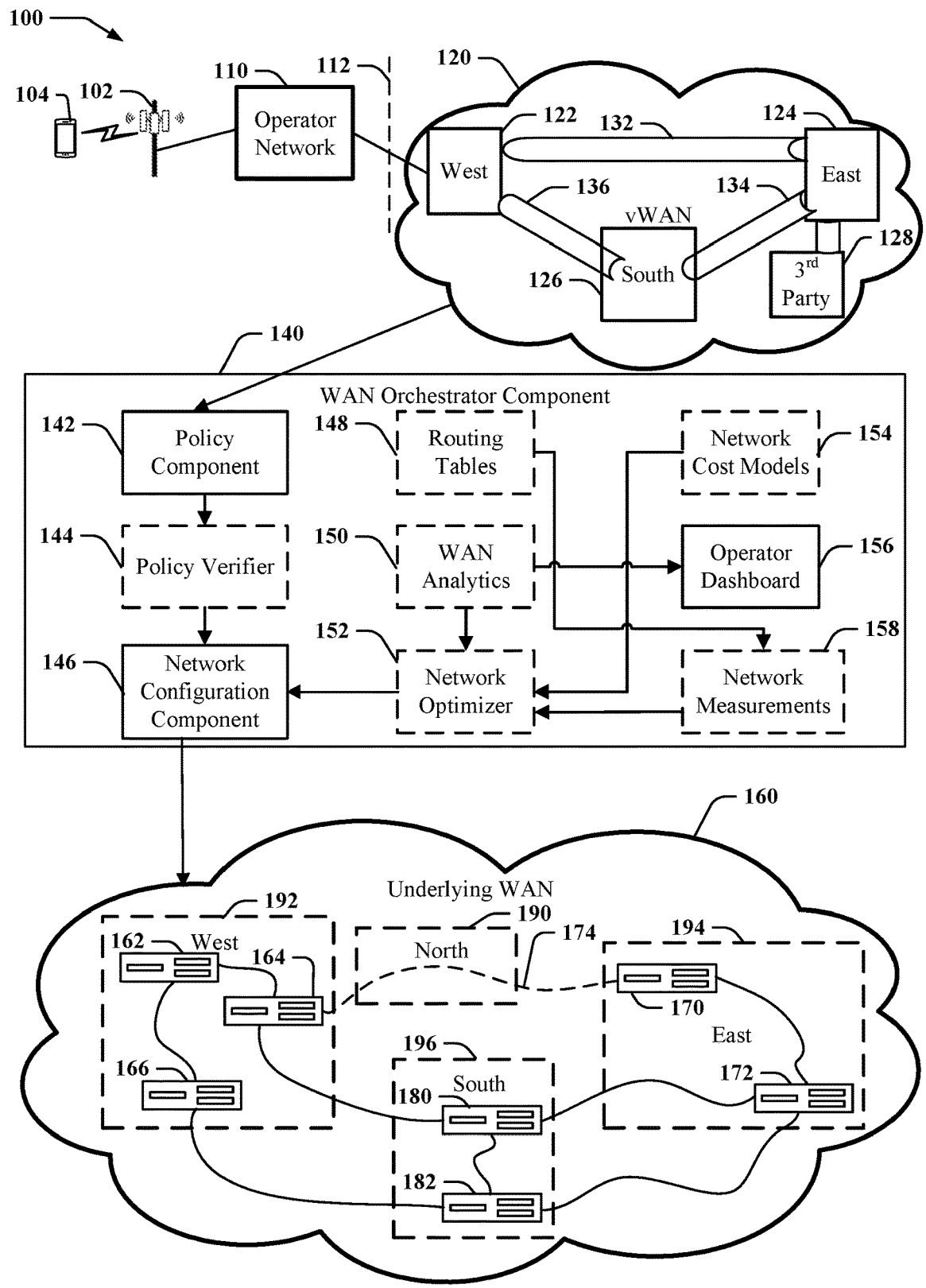
FIG. 1 is a diagram of an example of an architecture for a virtual wide area network (vWAN), in accordance with aspects described herein.

FIG. 1 is a conceptual diagram 100 of an example of an architecture for a vWAN 120. The vWAN 120 may be connected to an operator network 110. The vWAN 120 may be connected to an operator network 110. The vWAN 120 may be implemented by an underlying WAN 160. A WAN orchestrator component 140 may configure the underlying WAN 160 based on the vWAN 120.

The operator network 110 may be a customer of the vWAN 120. The operator network 110 may be, for example, a radio access network (RAN) including a user device 104 and a base station 102. The operator network 110 may be connected to the vWAN 120 at a boundary 112 to expand the operator network 110. For instance, the vWAN 120 may provide a connection to $3^{rd}$ party services 128 that are hosted on the vWAN or the vWAN 120 may host services of the operator network 110. Additionally, the vWAN 120 may include virtual network entities (e.g., virtual network entity 124), which may represent a presence in a geographic region where the operator network 110 does not have physical resources. In some implementations, the vWAN 120 may include a virtual radio access network (vRAN). For instance, the vWAN 120 may perform functions of a core network or may include virtual base stations that perform RAN processing.

The WAN orchestrator component 140 may provide an operator dashboard 156 to a network operator. The operator dashboard 156 may include a representation of the vWAN 120. For instance, the representation of the vWAN 120 may include virtual network entities 122, 124, and 126 and virtual connections 132, 134, and 136. In some implementations, the representation of the vWAN 120 may include the boundary 112 and a representation of the operator network 110. The virtual network entities 122, 124, and 126 may each be associated with a respective geographic location 190, 192, 194, 196. The geographic locations 190, 192, 194, 196 may be of different sizes. For example, a geographic location may be a city, a state, a region, or a country. In some implementations, a geographic location is associated with a point of presence. In the illustrated example, the virtual network entities 122, 124, and 126 are labelled West, East, and South, respectively. The virtual network entity 122 may be associated with a geographic location 192, the virtual network entity 124 may be associated with a geographic location 194, and the virtual network entity 126 may be associated with a geographic location 196.

In the underlying WAN 160, physical resources may be located within each geographic location corresponding to a virtual network entity. For example, the geographic location 192 associated with virtual network entity 122 may include physical resources 162, 164, and 166, the geographic location 194 associated with virtual network entity 124 may include physical resources 170 and 172, and the geographic location 196 associated with virtual network entity 126 may include physical resources 180 and 182. The geographic location 190 may represent a geographic location where the underlying WAN 160 does not have any physical resources. The vWAN 120 may not include a virtual network entity corresponding to the geographic location 190.

The virtual connections 132, 134, and 136 may represent connections between virtual network entities. The virtual connections 132, 134, and 136 may be implemented by the underlying WAN using any connections in the underlying WAN 160. For instance, in the illustrated example, the virtual connection 132 may not correspond to a direct physical connection between any resource in the geographic region associated with the virtual network entity 122 and any resource in the geographic region associated with the virtual network entity 124. That is, the illustrated connection 174 may not exist. Instead, the virtual connection 132 may represent any path from a physical resource within the geographic region associated with the virtual network entity 122 to any resource in the geographic region associated with the virtual network entity 124, including resources and/or connections within the geographic region associated with the virtual network entity 126.

In an aspect, the operator dashboard 156 allows the network operator to set policies for the virtual connections 132, 134, and 136. For example, the network operator may host a service on the virtual network entity 124 and/or want to provide user devices 104 with access to a $3^{rd}$ party service 128 connected to the virtual network entity 124. The network operator may further want to avoid sending traffic through a specific geographic region (e.g., a north geographic location 190). For example, the geographic region may not have laws or regulations that satisfy a data privacy law applicable to the operator network 110 or network policy of the operator network 110. The operator dashboard 156 may configure the virtual connection 132 with a routing policy that directs traffic for the desired service to the virtual network entity 124, performance policies that provide a level of service for such traffic, and a geographic restriction to prevent the traffic from entering the north region (i.e., geographic location 190). Further details of policy configuration are described below with respect to FIG. 2.

The WAN orchestrator component 140 may translate the policy for the vWAN 120 into a configuration of the underlying WAN 160. The WAN orchestrator component 140 may include a policy component 142 configured to receive a policy for the vWAN 120 from the network operator via the representation. The policy may be a policy to be implemented at one or more of the virtual connections. The WAN orchestrator component 140 may include a network configuration component 146 configured to translate the policy for the vWAN 120 into a configuration of the underlying WAN 160. In some implementations, the WAN orchestrator component 140 may optionally include a policy verifier configured to determine whether an operator policy is feasible.

In some implementations, the WAN orchestrator component 140 may be configured to determine a configuration of the underlying WAN 160 based on a cost metric. For example, the WAN orchestrator component 140 may optionally include a network optimizer configured to determine the configuration of the underlying WAN 160 based on one or more of network cost models 154, network measurement component 158, or WAN analytics component 150. The network measurement component 158 may generate measurements based on routing tables 148.

FIG. 2 is a diagram 200 of configuration of policies for virtual connections in a vWAN. In an aspect, policies for a virtual connection (e.g., virtual connection 132) may be configured for one or more traffic classes 220, 230. A traffic class may be defined based on selection criteria. For example, the selection criteria may specify a service, a type of traffic, or a group of users. For instance, a first traffic class 220 may be for any user of a network service hosted at the virtual network entity 124 and a second traffic class 230 may be for a group of premium users subscribed to a $3^{rd}$ party service hosted at the virtual network entity 124. In an aspect, the operator dashboard 156 provides a user interface for configuring vWAN policies. For instance, a network operator may select a representation of the virtual connection 132 to see a list of traffic classes and applicable policies for the virtual connection 132.

A routing policy 221, 231 may specify a route including a specific virtual connection to use or a specific virtual network entity as a destination for a class of traffic. For example, a routing policy may route traffic from the operator network 110 for a first group of users to the virtual network entity 124 via the virtual connection 132 and route traffic for a second group of users to the virtual network entity 126 via the virtual connection 136. In some implementations, a routing policy may be specified with respect to a virtual network entity but affect a virtual connection. For instance, when translating a routing policy, each physical resource along a path may be configured based on the policy for the virtual connection.

A performance policy 222, 232 may specify a traffic tier or a specific performance metric to be targeted for a class of traffic. A performance policy 222, 232 may be specified for a virtual connection. For example, a performance policy 222, 232, may specify a maximum latency or minimum bandwidth for a virtual connection 132. The WAN orchestrator component 140 may determine a path in the underlying WAN 160 that can satisfy the performance policy. For instance, the latency for a path may be a sum of latency of individual connections along the path in the underlying WAN 160. The bandwidth for a path may be a minimum available bandwidth for any connection along the path.

A peering policy 223, 233 may specify peering between an operator network and a vWAN network entity. For example, the peering policy may specify physical connections and capacity requirements . . . .

A geographic policy 224, 234 may specify geographic regions for a traffic class. For example, a geographic policy 224, 234 may specify one or more geographic regions where traffic for the traffic class is restricted.

A hardware constraint 225, 235 may specify hardware that is to be used or is not to be used for a virtual connection and/or at a virtual network entity. In conventional vWANs, the physical resources of the underlying WAN are considered generic. Some network operators, however, may have a policy against using hardware from a particular vendor. For instance, a particular vendor may be considered to provide poor performance or have security vulnerabilities. The hardware constraint 225, 235 may specify a particular vendor or class of hardware. The WAN orchestrator component 140 may check that physical resources (e.g., a router 164) satisfy the hardware constraint 225, 235 when selecting a path to implement the virtual connection 132. Further, the WAN orchestrator component 140 may select different paths for each traffic class due to the hardware constraints 225, 235.

FIG. 3 is a schematic diagram of an example of a device 300 (e.g., a computing device) for providing representation and orchestration of a vWAN. The device 300 may be implemented on a physical resource within the underlying WAN 160. For instance, the device 300 may be implemented at the server 180. The device 300 may communicate with a network operator via a portal, which may be accessed from outside the underlying WAN 160 (e.g., via a website).

In an example, device 300 can include a processor 302 and/or memory 304 configured to execute or store instructions or other parameters related to providing an operating system 306, which can execute one or more applications or processes, such as, but not limited to, at least one of the WAN orchestrator component 140 for configuring the underlying WAN 160 based on policies received from a network operator. For example, processor 302 and memory 304 may be separate components communicatively coupled by a bus (e.g., on a motherboard or other portion of a computing device, on an integrated circuit, such as a system on a chip (SoC), etc.), components integrated within one another (e.g., processor 302 can include the memory 304 as an on-board component), and/or the like. Memory 304 may store instructions, parameters, data structures, etc. for use/execution by processor 302 to perform functions described herein.

In an example, the WAN orchestrator component 140 may optionally include one or more of an operator dashboard 156 configured to present to a network operator a representation of a virtual WAN including virtual network entities associated with respective geographic locations and virtual connections between the virtual network entities; a policy component 142 configured to receive a policy for the virtual wide area network from the network operator via the representation; and a network configuration component 146 configured to translate the policy for the virtual wide area network into a configuration of an underlying WAN.

In some implementations, the WAN orchestrator component 140 may optionally include a policy verifier 144 configured to determine whether an operator policy is feasible. For instance, in the illustrated example of FIG. 1, if the operator policy includes a restriction on the geographic location 190, and the virtual connection 132 can be implemented without the connection 174, the geographic policy may be feasible. In contrast, if the geographic policy were to also restrict the geographic location 196 associated with the virtual network entity 126, such a policy may not be feasible as the underlying WAN 160 may not include a path from the virtual network entity 122 to the virtual network entity 124 that satisfies the geographic restrictions. Similarly, the policy verifier 144 may determine whether routing policies, performance policies, peering policies, and hardware constraints can be satisfied by the underlying WAN 160. The policy verifier 144 may provide verified feasible policies to the network configuration component 146.

The network configuration component 146 may implement virtual connections in the underlying WAN 160. In some aspects, the network configuration component 146 may configure tunnels that carry traffic for a particular virtual connection. In some implementations, the tunnels may be implemented by a truncated protocol forwarding mechanism. For instance, the truncated protocol forwarding mechanism may bypass a portion of a network protocol stack based on a field of a packet header. In some implementations, the network configuration component 146 may configure routing tables 148 at each node to route the traffic according to the policies.

In some implementations, the WAN orchestrator component 140 may configure the underlying WAN 160 based on cost or performance goals. For instance, the WAN orchestrator component 140 may optionally include network cost models 154 that assign costs to various types of traffic. For instance, the network cost models 154 may assign a base cost to each connection in the underlying WAN 160. The base cost may be weighted by particular properties of the traffic (e.g., latency).

In some implementations, the network WAN orchestrator component 140 may optionally include a network measurement component 158 that monitors existing traffic on the underlying WAN 160. For example, the network measurement component 158 may determine performance metrics for virtual connections to determine whether a performance policy is being satisfied.

The network WAN orchestrator component 140 may include a WAN analytics component 150 that analyzes a current state of the underlying WAN 160. In some implementations, the WAN analytics component 150 may provide information to the operator dashboard 156, which may allow the network operator to use the information in determining vWAN policies. For instance, the operator dashboard may provide service levels and costs for determining a performance policy. A network optimizer 152 may receive input from the network cost models 154, the network measurement component 158, and the WAN analytics component 150. The network optimizer 152 may determine cost and performance characteristics of various paths that satisfy the operator policies. The network optimizer 152 may provide the cost and performance characteristics to the network configuration component 146, which may select which paths to use to satisfy the operator policies 210.

FIG. 4 is a flow diagram of an example of a method 400 for providing representation and orchestration of a vWAN. For example, the method 400 can be performed by a device 300 and/or one or more components thereof to configure the underlying WAN 160 based on operator policies selected via the representation of the vWAN 120.

At block 410, the method 400 includes presenting, to a network operator, a representation of the vWAN including virtual network entities associated with respective geographic locations and virtual connections between the virtual network entities. In an example, the operator dashboard 156, e.g., in conjunction with processor 302, memory 304, and operating system 306, can presenting, to a network operator (e.g., an operator of operator network 110), a representation 240 of the virtual WAN 120 including virtual network entities 122, 124, and 126 associated with respective geographic locations and virtual connections 132, 134, and 136 between the virtual network entities.

At block 420, the method 400 includes receiving a policy for the vWAN from the network operator via the representation, the policy to be implemented at one or more of the virtual connections. In an example, the policy component 142, e.g., in conjunction with processor 302, memory 304, and operating system 306, can receive the policy 210 for the vWAN from the network operator via the representation.

The policy 210 may be applicable to one or more of the virtual connections. For example, the policy 210 may include one or more of a routing policy, a performance policy, a peering policy, or a geographic policy. In some implementations, the policy 210 may include a hardware constraint.

At block 430, the method 400 includes translating the policy for the vWAN into a configuration of an underlying WAN. In an example, the network configuration component 146, e.g., in conjunction with processor 302, memory 304, and operating system 306, can translate the policy 210 for the vWAN 120 into a configuration of the underlying WAN 160.

In some implementations, in sub-block 432, the block 430 may optionally include establishing tunnels that each appear as a single connection between two of the virtual network entities, each tunnel associated with requirements based on the policy. For example, the policy verifier 144 may convert operator policies into requirements and associate the requirements with a tunnel path. For instance, if the routing policy specifies traffic for the virtual connection 132, the requirements may include connectivity between the two virtual network entities 122 and 124. As another example, if the policy includes a geographic policy or a hardware constraint, the requirement may indicate that the tunnel not include any devices within a specified geographic location or from a specified vendor.

At block 440, the method 400 includes applying the configuration to the underlying WAN. In an example, the network configuration component 146, e.g., in conjunction with processor 302, memory 304, and operating system 306, can apply the configuration to the underlying WAN 160.

In some implementations, in sub-block 442, the block 440 may optionally include configuring a plurality of nodes along a path in the underlying WAN to satisfy the requirements of each tunnel. For example, the network configuration component 146 may select the plurality of nodes that satisfy the requirements. In an aspect, the network configuration component 146 may receive path properties from the network optimizer 152. For example, the network optimizer 152 may provide cost and performance information for multiple paths, and the network configuration component 146 may select a path that satisfies the requirements based on the cost. In some implementations, in sub-block 444, the block 440 may optionally include configuring a truncated protocol forwarding mechanism. In some implementations, in sub-block 446, the block 440 may optionally include configuring routing tables at each node along the path.

Figure 5:
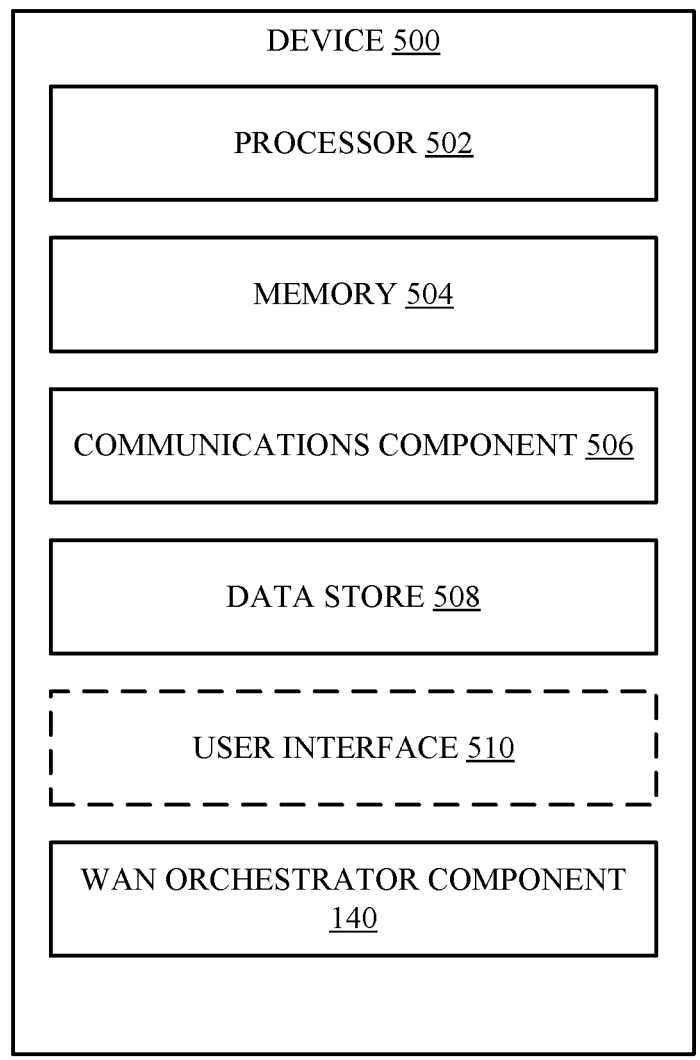
FIG. 5 is a schematic diagram of an example of a device for performing functions described herein, in accordance with aspects described herein.

FIG. 5 illustrates an example of a device 500 including additional optional component details as those shown in FIG. 4. In one aspect, device 500 may include processor 502, which may be similar to processor 302 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 304 such as for storing local versions of operating systems (or components thereof) and/or applications being executed by processor 502, such as WAN orchestrator component 140, operator dashboard 156, policy component 142, network configuration component 146, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc. not currently being executed by processor 502. In addition, data store 508 may be a data repository for WAN orchestrator component 140.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include a WAN orchestrator component 140 for managing a vWAN based on operator policies, an operator dashboard 156 for presenting, to a network operator, a representation of the vWAN, a policy component 142 for receiving a policy for the virtual wide area network from the network operator via the representation, a network configuration component 146 for translating the policy for the virtual wide area network into a configuration of the underlying WAN, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of configuring a virtual wide area network (vWAN), comprising:
   presenting, to an operator network connected to the vWAN, a representation of the vWAN, the representation including virtual network entities and virtual connections within the vWAN between the virtual network entities, wherein the virtual network entities presented to the operator network include: regional virtual network entities, each corresponding to a respective geographic region and representing all physical resources located within the respective geographic location, the operator network, and a boundary between the operator network and the vWAN;
   receiving a policy for the virtual wide area network from the operator network via the representation, the policy to be implemented at one or more of the virtual connections; and
   translating the policy for the virtual wide area network into a configuration of an underlying wide area network (WAN).

2. The method of claim 1, wherein the policy is a geographic policy that specifies a geographic region that traffic for the virtual connection is not allowed to traverse.

3. The method of claim 1, wherein the policy for the virtual WAN includes policies for a plurality of traffic classes.

4. The method of claim 1, wherein translating the configuration of the virtual WAN comprises establishing tunnels that each appear as a single connection between two of the virtual network entities, each tunnel associated with requirements based on the policy; and wherein applying the configuration to the underlying WAN comprises configuring a plurality of nodes along a path in the underlying WAN to satisfy the requirements of each tunnel.

5. The method of claim 1, wherein presenting, to the operator network connected to the vWAN, the representation of the vWAN, comprises providing an operator dashboard that presents a user interface that allows a network operator of the operator network to select a representation of a virtual connection to display a list of traffic classes and applicable policies for the virtual connection.

6. The method of claim 1, wherein the representation of the virtual WAN includes services of third parties hosted on the underlying WAN and the virtual connections include connections between virtual network entities and the services of the third parties.

7. The method of claim 2, wherein the policy for the virtual WAN includes one or more of a routing policy, a performance policy, a peering policy, or a geographic policy.

8. The method of claim 2, wherein the policy for the virtual WAN includes a hardware constraint that specifies a type of physical resource that is not to be used for the virtual connection.

9. An apparatus for managing policies for a virtual wide area network (vWAN), comprising:
   a memory storing one or more instructions for managing the vWAN; and
   at least one processor coupled to the memory and configured to execute the instructions, wherein the at least one processor is configured to:
     present, to an operator network connected to the vWAN, a representation of the vWAN, the representation including virtual network entities and virtual connections within the vWAN between the virtual network entities, wherein the virtual network entities presented to the operator network include: regional virtual network entities, each corresponding to a respective geographic region and representing all physical resources located within the respective geographic location, the operator network, and a boundary between the operator network and the vWAN;
     receive a policy for the virtual wide area network from the operator network via the representation, the policy to be implemented at one or more of the virtual connections;
     translate the policy for the virtual wide area network into a configuration of an underlying wide area network (WAN); and
     apply the configuration to the underlying WAN.

10. The apparatus of claim 9, wherein the policy is a geographic policy that specifies a geographic region that traffic for the virtual connection is not allowed to traverse.

11. The apparatus of claim 9, wherein the policy for the virtual WAN includes policies for a plurality of traffic classes.

12. The apparatus of claim 9, wherein to translate the configuration of the virtual WAN, the at least one processor is configured to establish tunnels that each appear as a single connection between two of the virtual network entities, each tunnel associated with requirements based on the policy; and wherein to apply the configuration to the underlying WAN, the at least one processor is configured to configure a plurality of nodes along a path in the underlying WAN to satisfy the requirements of each tunnel.

13. The apparatus of claim 12, wherein configuring the plurality of nodes in the underlying WAN includes configuring routing tables at each node along the path.

14. The apparatus of claim 12, wherein configuring the plurality of nodes in the underlying WAN to satisfy the requirements is based on a cost metric.

15. The apparatus of claim 9, wherein presenting, to the operator network connected to the vWAN, the representation of the vWAN, comprises providing an operator dashboard that presents a user interface that allows a network operator of the operator network to select a representation of a virtual connection to display a list of traffic classes and applicable policies for the virtual connection.

16. The apparatus of claim 9, wherein the representation of the virtual WAN includes services of third parties hosted on the underlying WAN and the virtual connections include connections between virtual network entities and the services of the third parties.

17. The apparatus of claim 9, wherein the policy for the virtual WAN includes one or more of a routing policy, a performance policy, a peering policy, or a geographic policy.

18. The apparatus of claim 9, wherein the policy for the virtual WAN includes a hardware constraint that specifies a type of physical resource that is not to be used for the virtual connection.

19. A system for managing configuration and policies for a virtual wide area network (vWAN), comprising:
- a wide area network (WAN) including a plurality of geographically distributed physical computing resources and connections there between; and
- a network orchestrator including a memory storing one or more parameters or instructions for managing the vWAN on the WAN and at least one processor coupled to the memory, wherein the at least one processor is configured to execute the instructions to:
  - present, to an operator network connected to the vWAN, a representation of the VWAN, the representation including virtual network entities and virtual connections within the vWAN between the virtual network entities, wherein the virtual network entities presented to the operator network include: regional virtual network entities, each corresponding to a respective geographic region and representing all physical resources located within the respective geographic location, the operator network, and a boundary between the operator network and the vWAN;
  - receive a policy for the virtual wide area network from the operator network via the representation, the policy to be implemented at one or more of the virtual connections;
  - translate the policy for the virtual wide area network into a configuration of the WAN; and
  - apply the configuration to the WAN.

* * * * *